United States Patent [19]

Sears

[11] Patent Number: 4,779,839

[45] Date of Patent: Oct. 25, 1988

[54] SYSTEM FOR ACTUATING AN ELECTRICAL VALVE FROM A REMOTE LOCATION

[76] Inventor: Lawrence M. Sears, 3263 Glencairn Rd., Shaker Heights, Ohio 44122

[21] Appl. No.: 935,963

[22] Filed: Nov. 28, 1986

[51] Int. Cl.⁴ .................................................. F16K 31/44
[52] U.S. Cl. .................................. 251/68; 251/129.04; 340/825.54
[58] Field of Search ............... 251/129.04, 30.01, 68; 361/156; 340/825.54, 551, 552; 236/51

[56] References Cited

U.S. PATENT DOCUMENTS

| | | | |
|---|---|---|---|
| 2,910,079 | 10/1959 | Beeghly | 251/68 X |
| 3,975,666 | 8/1976 | Redding | 361/156 |
| 4,469,304 | 9/1984 | Kah, Jr. | 251/65 |
| 4,517,563 | 5/1985 | Diamant | 340/825.54 |
| 4,651,777 | 3/1987 | Hardman | 251/129.04 |

Primary Examiner—William E. Wayner

[57] ABSTRACT

A system for actuating an electrical valve from a remote location with a battery includes an energy storage means for actuating the valve, a charging circuit for charging the energy storage means from the battery to a sufficient potential to actuate the valve, detector means for sensing a signal indicative of a desire to actuate the valve and for actuating said charging circuit and switch means for connecting the energy storage means to the valve to actuate the valve when the energy storage means is charged to a sufficient potential.

38 Claims, 3 Drawing Sheets

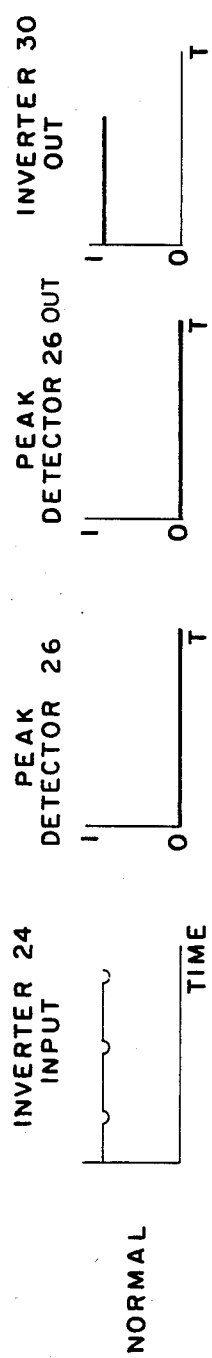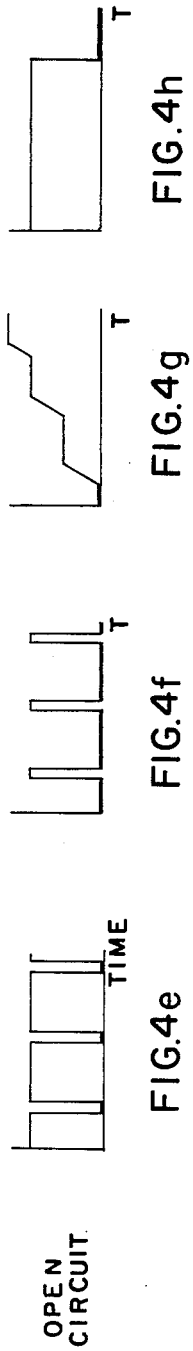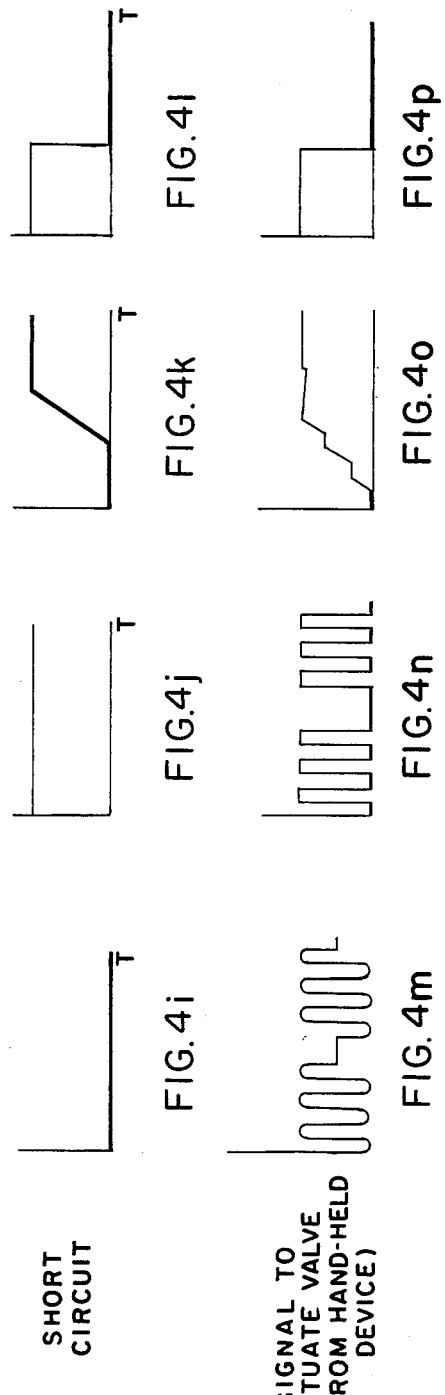

SYSTEM FOR ACTUATING AN ELECTRICAL VALVE FROM A REMOTE LOCATION

BACKGROUND OF THE DISCLOSURE

Field of the invention

The present invention relates to a system for actuating an electrical valve from a remote location utilizing a battery to provide power to actuate the valve. A supervisory circuit loop including a capacitor and inductor therein is provided for receiving a signal indicative of a desire to close the valve. The use of the capacitor as the supervisory element in the supervisory circuit loop minimizes current drain and allows the battery to continuously energize the supervisory circuit loop and still have enough energy to actuate the valve after many years of use. An energy storage means is provided and is charged from the battery by a charging circuit when the supervisory circuit loop senses a signal indicative of a desire to close the valve. A feedback circuit is provided to feedback to the supervisory circuit loop a signal indicative of valve actuation.

Circuits for actuating an electrical valve from a remote location are known in the art. In many of the known systems line potential is utilized to actuate a solenoid valve. However, when it is desired to use a battery rather than line potential it is imperative to minimize battery drain to provide for long system life. The Cah U.S. Pat. No. 4,469,304 discloses a pulse actuated solenoid valve which utilizes a capacitor to provide the required electromagnetic force across a solenoid coil to actuate a valve.

Supervisory circuit loops are also known in the prior art. In known supervisory circuit loops a resistor is utilized in the supervisory circuit loop which provides a current drain. This is acceptable where the supervisory circuit loop is powered by line current but is unacceptable when a small battery is utilized to power the supervisory circuit loop and long life is expected.

The present invention provides a new and improved system for actuating an electric valve from a remote location which utilizes a battery to power the system and which includes a capacitor as the supervisory element rather than a resistor in a supervisory circuit loop to minimize current drain from the battery. The capacitor provides for higher security when used in the supervisory circuit loop than a resistor because a resistor can be easily measured by an ohm meter.

SUMMARY OF THE INVENTION

The present invention relates to a new and improved system for actuating an electric valve from a remote location and particularly to a system which is adapted to actuate a valve which is adapted to control utility usage. Many utilities provide for the flow of a fluid, such as water or gas, to a structure. The resident of the structure is then required to pay the utility for the indicated usage of the fluid. Occasionally, it is desired to shut off utility usage to a customer for such reasons as non-payment. In some utility systems the shut-off valve is located within the structure and cannot be easily accessed by utility company personnel to shut down utility usage. In these cases it is desirable to be able to remotely actuate from outside the structure the valve which is located in the structure which controls the flow of the fluid from the utility into the structure.

Thus, it is desirable to provide a system for actuating the electrical valve from a remote location. It is further desirable to be able to provide the utility personnel with a signal indicative of the fact that the valve has been actuated and to provide a system which will not actuate the valve as a result of spurious interference. It is also advantageous to provide a system which includes a supervisory circuit loop and a supervisory element which can be located remotely from the valve and which is adapted to receive a signal to effect actuation of the valve and wherein tampering with the supervisory circuit loop effects actuation of the valve. In addition, it is desirable to provide a system which is reliable even in harsh environments, which is easily installed at a utility usage location and which operates on a battery rather than on line current. In order to enable the system to operate on a battery, low current drain from the battery must be present in order to insure long battery life.

The present invention relates to a new and improved system for actuating an electric valve from a remote location which is adapted to operate on a battery and provide low battery drain and hence long battery life.

The present invention further relates to a system for actuating an electric valve from a remote location which includes a means for indicating actuation of the valve.

The present invention further relates to a system for actuating an electric valve from a remote location utilizing a battery which includes a supervisory circuit loop which utilizes a capacitor to minimize current drain in the supervisory circuit loop.

The present invention relates to a system for actuating an electric valve from a remote location which includes a battery, energy storage means for storing a sufficient amount of energy to actuate the valve, a charging circuit connected to the battery and to the energy storage means for charging the energy storage means to a sufficient potential to actuate the valve, detector means for sensing a signal indicative of a desire to actuate the valve and actuating the charging circuit to effect charging of the energy storage means in response to the signal being sensed by the detector means, and switch means for connecting the energy storage means to the valve to actuate the valve when the energy storage means is charged to a potential sufficient to actuate the valve.

The present invention further provides a new and improved system for actuating an electric valve from a remote location as set forth in the preceeding paragraph further including a supervisory circuit loop connected to the detector means and a supervisory signal generator for continuously energizing the supervisory circuit loop.

The present invention provides a new and improved system for actuating an electric valve from a remote location including switch means for actuating the valve, valve sensing means connected to the valve to sense actuation thereof, signal sensing means located remote from the valve for sensing a signal indicative of a desire to actuate the valve, a signal generator for generating the signal indicative of a desire to actuate the valve, circuit means responsive to the signal sensing means sensing the signal indicative of a desire to close the valve for establishing a unique signal at the signal sensing means which indicates that the valve is about to actuate, the valve sensing means, when sensing actuation of the valve, deactivating the circuit means to remove the unique signal from the signal sensing means and detector means responsive to the presence or absence of the unique signal at the signal sensing means for detecting actuation of the valve.

The present invention further relates to a new and improved system for actuating an electric valve from a remote location including a battery, energy storage means for storing a sufficient amount of energy to actuate the valve, a charging circuit connected to the battery and the energy storage means for charging the energy storage means to a sufficient potential to actuate the valve, a supervisory circuit loop energized by the battery and a capacitor disposed in the supervisory circuit loop. The supervisory circuit loop is adapted to receive a signal indicative of a desire to close the valve to actuate the charging circuit to charge the energy storage means to a sufficient potential to actuate the valve. The supervisory circuit loop, when broken, actuates the charging circuit to charge the energy storage means to a sufficient potential to actuate the valve, and when shorted or opened, actuates the charging circuit to charge the energy storage means to a sufficient potential to actuate the valve.

DESCRIPTION OF THE DRAWINGS

FIG. 4 illustrates the inputs and outputs to various circuit elements of the system for actuating the electrical valve wherein;

FIG. 4a illustrates the normal input to the inverter 24 when the output of the clock is filtered by the supervisory element, capacitor 20, and resistor 84.;

FIG. 4b illustrates the normal input to the peak detector;

FIG. 4c illustrates the normal output of the peak detector;

FIG. 4d illustrates the normal output of inverter 30;

FIG. 4e illustrates the input to inverter 24 if the supervisory circuit loop is broken;

FIG. 4f illustrates the input to the peak detector when the supervisory circuit loop is broken;

FIG. 4g illustrates the output of the peak detector when the supervisory circuit loop is broken;

FIG. 4h illustrates the output of inverter 30 when the supervisory circuit loop is broken;

FIG. 4i illustrates the input to inverter 24 when the supervisory circuit loop is shorted;

FIG. 4j illustrates the input to the peak detector when the supervisory circuit loop is shorted;

FIG. 4k illustrates the output of the peak detector when the supervisory circuit loop is shorted;

FIG. 4l illustrates the output of inverter 30 when the supervisory circuit loop is shorted;

FIG. 4m illustrates the input induced the supervisory circuit loop via coil 18 by the signal generator when it is desired to actuate the valve;

FIG. 4n illustrates the input to the peak detector upon receipt in the supervisory circuit loop of the signal indicative of a desire to actuate the valve;

FIG. 4o illustrates the output of the peak detector when it receives the signal indicative of the desire to close the valve; and FIG. 4p illustrates the output of inverter 30 when the signal indicative of a desire to actuate the valve is induced in the supervisory circuit loop.

DESCRIPTION OF THE PREFERRED EMBODIMENT

Figure 1:
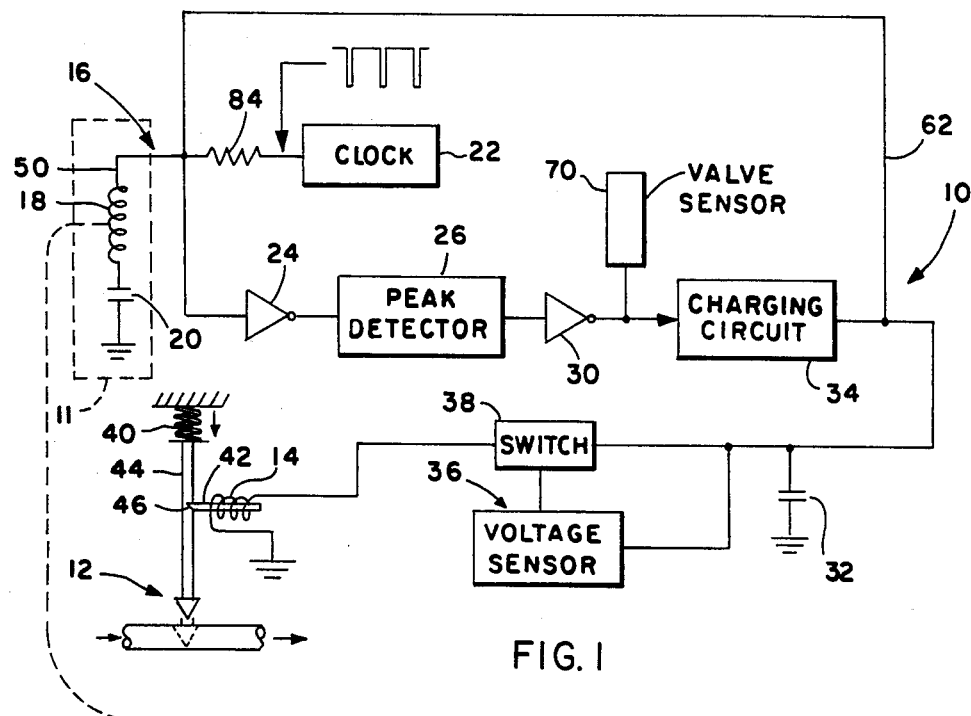
FIG. 1 is a block diagram of the system for actuating an electrical valve from a remote location which also illustrates the valve schematically.

A system 10 for actuating an electrical valve 12 having an actuating or solenoid coil 14 therein is illustrated in FIG. 1. The system 10 includes a supervisory circuit loop 16 which is adapted to be located remote from the valve 12 and which is adapted to have a signal induced therein indicative of a desire to actuate the valve 12. The supervisory circuit loop 16 includes an inductor coil 18 and a capacitor 20 in series therein. Preferably, the coil 18 and capacitor 20 are assembled together in a small enclosure 11. The capacitor 20 is the supervisory element in the supervisory current loop and removing or shorting of the capacitor 20 will modify the voltage across the supervisory circuit loop 16. The use of the capacitor 20 in the supervisory circuit loop 16 provides additional security than if a resistor was used, as a resistor is a much more common circuit element than a capacitor, and can be easily measured with an ohm meter. The coil 18 is adapted to have a signal induced therein which is indicative of a desire to actuate the valve 12. Since the coil 18 and capacitor 20 are located together in enclosure 11 at a remote location it is desirable to encapsulate these elements to protect them from the environment. The use of a coil 18 allows a signal to be induced in the supervisory circuit loop 16 without any direct contact with the coil 18. This eliminates the use of contacts or connectors which would reduce the reliability of the system.

The valve 12 is preferably a valve which controls the flow of a fluid, such as water or gas, from a utility to a user located within a structure such as a house or building. The valve 12 may be located in the structure and the supervisory circuit loop 16 can extend from the valve 12 to the outside of the structure. Preferably, the inductor coil 18 and capacitor 20 are located on the outside of the structure in enclosure 11 and are easily accessible by utility personnel.

Figure 5:
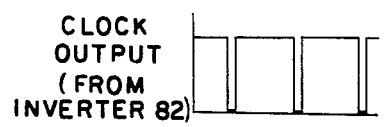
FIG. 5 illustrates the output of the clock 22.

A clock circuit 22 is operable to establish periodic signals, as is illustrated in FIG. 5, in the supervisory circuit loop 16 and direct such signals to an inverter 24. The input to inverter 24 will be indicative of the condition of the supervisory circuit loop 16 as will be more fully explained hereinafter. The normal input to inverter 24 from the clock generator 22 is illustrated in FIG. 4a when the output of the clock 22 is filtered by the supervisory element capacitor 20. The inverter 24 is connected to the input of a peak detector 26 which is operable to monitor the output of the inverter 24 which is indicative of the condition of the supervisory circuit loop 16. The peak detector normally has a low input and a low output, as is illustrated in FIG. 4b and FIG. 4c when the clock signal from the clock 22 is filtered by the capacitor 2 in the supervisory circuit loop 16. An inverter 30 is connected to the output of the peak detector 26 and has a normally high output, as is illustrated in FIG. 4d when the filtered clock signal is directed to the peak detector 26.

An energy storage means in the form of capacitor 32 is provided for energizing the valve 12 to effect actuation thereof. The capacitor 32 is connected to the output of a high voltage charging circuit 34, which is connected to the output of inverter 30 and to a battery 31, more fully illustrated in FIG. 3, which powers all of the elements of the system 10 for actuating the electrical valve 12. The charging circuit 34 is adapted to charge capacitor 32 to a sufficient potential to energize valve 12 upon tampering with the supervisory circuit loop 16 or upon receipt of a signal in the supervisory circuit loop 16 indicative of a desire to actuate the valve 12. When the output of the inverter 30 is high, as is illustrated in FIG. 4d, the charging circuit is disabled.

When it is desired to actuate the valve 12, a signal, as is illustrated in FIG. 4m, is induced in the coil 18 in the supervisory circuit loop 16 by a signal generator 54, more fully described hereinafter, which can be carried by utility personnel. The signal, as illustrated in FIG. 4m, is an AC waveform of periodic bursts of AC carrier which modifies the input to the peak detector 26, as is illustrated in FIG. 4n. The output of the peak detector 26, when an AC signal is induced into the coil 18, is illustrated in FIG. 4o. Thus, when a signal, such as illustrated in FIG. 4m, indicative of a desire to close the valve, is sensed by the peak detector 26, the output of the peak detector changes from low to high. When the output of the peak detector 26 goes high, it is directed to the inverter 30 and the output of the inverter 30 goes low, as is illustrated in FIG. 4p. When the output of inverter 30 goes low, the charging circuit 34 is enabled to charge capacitor 32. The charging circuit 34 then initiates charging of capacitor 32 to a predetermined, relatively high voltage which is sufficient to actuate valve 12.

A voltage sensor 36 is connected to the capacitor 32 to sense when the capacitor 32 is charged to a potential sufficient to acuate the valve 12. When the sensor 36 senses that the capacitor 32 has been charged to the predetermined potential which is sufficient to actuate valve 12, sensor 36 closes a switch 38 to discharge capacitor 32 through the solenoid coil 14 of valve 12 to effect actuation thereof.

Valve 12, as is schematically illustrated in FIG. 1, is adapted to be actuated when the coil 14 is energized. The valve 12 which is normally open, is biased toward its closed position by a spring 40. An escapement mechanism 42 engages in a notch 46 in a stem 44 of the valve 12 to prevent movement of the valve stem 44 and valve 12 by spring 40 to the valve's closed position. When coil 14 is energized, the escapement 42 is retracted and moves out of notch 46 in the valve stem 44 to allow the valve 12 to close under the biasing force of spring 40. Thus, the amount of energy to effect movement of the valve from its normally open position, illustrated in full lines in FIG. 1, to its closed position, illustrated in phantom lines in FIG. 1, is minimized due to the fact that the solenoid coil 14 in the valve 12 merely moves an escapement 42 and the closing of the valve 12 is effected by the spring 40. Such a system allows the capacitor 32 to effect actuation of the valve 12 with minimal current drain from the battery 31. While FIG. 1 illustrates one embodiment of the valve 12, various other configurations could be utilized without departing from the scope of the present invention. For example, the valve 12 could be opened instead of closed upon energization of solenoid coil 14.

The system 10 for actuating the electrical valve 12 from a remote location is designed to effect actuation of the valve 12 if tampering occurs in the supervisory circuit loop 16. If the supervisory circuit loop 16 is opened, such as by cutting a wire 50 in the supervisory circuit loop 16 and/or removing the coil 18 and/or capacitor 20 from the circuit 16, the input to the inverter detector 24 will change from that shown in FIG. 4a to that shown in FIG. 4e due to the removal of the coil 18 and capacitor 20 from the supervisory circuit loop 16. When the supervisory circuit loop 16 is broken, the input to the peak detector 26 will change to that illustrated in FIG. 4f causing the output of the peak detector 26 to go high, as is illustrated in FIG. 4g. A high output from peak detector 26 causes the output of the inverter 30 to go low, as is illustrated in FIG. 4h, thereby actuating the charging circuit 34 to effect closing of valve 12.

When the supervisory circuit loop 16 is shorted such as by connecting a wire around capacitor 20 and coil 18, the input to the inverter 24 goes low as is illustrated in FIG. 4i. This causes the input to the peak detector 26 to go high, as is illustrated in FIG. 4j, and the output of the peak detector 26 to go high, as is illustrated in FIG. 4k. A high output from the peak detector 26 causes the output of inverter 30 to go low, as is illustrated in FIG. 4l, to actuate the charging circuit 34, and allows the charging circuit 34 to charge the capacitor 32 to a potential sufficient to actuate valve 12. Thus, if it is desired to actuate the valve 12 an AC waveform, such as disclosed in FIG. 4m, can be utilized to energize the charging circuit 34 to charge capacitor 32 to a sufficient potential to actuate the valve 12. Additionally, if tampering occurs in the supervisory circuit loop 16 by either shorting or opening the supervisory circuit loop 16 or the circuit elements therein, the valve 12 will also be actuated.

Figure 2:
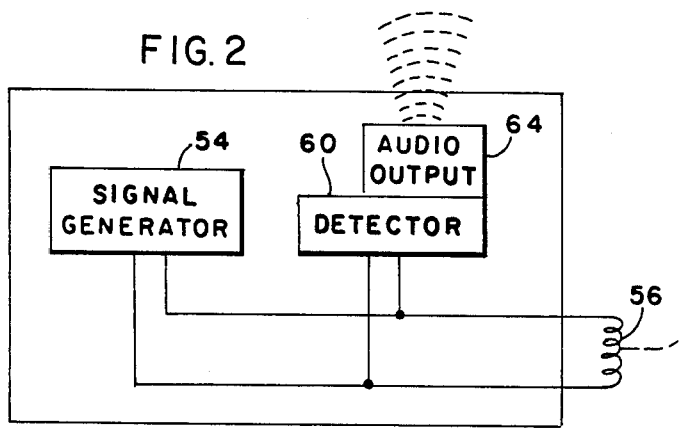
FIG. 2 is a block diagram of the signal generator for generating a signal indicative of a desire to close the valve and a detector for indicating actuation of the valve which are both disposed in a hand-held portable unit.

As is more fully illustrated in FIG. 2, a signal generator 54 is provided for establishing the signal indicative of a desire to close the valve 12 in the supervisory circuit loop 16. The signal generator 54, which in the preferred embodiment is an oscillator, has its output connected to a coil 56. The signal generator 54 is operable to establish the periodic burst of AC carrier, illustrated in FIG. 4m, in the coil 56 and to induce the AC waveform into the coil 18 in the supervisory circuit loop 16 when the coil 56 is brought into close proximity with the coil 18. The signal generator 54 is preferably a portable device which can be placed in close proximity to the coil 18 in the supervisory circuit loop 16, which is located remote from the valve 12, when it is desired to actuate the valve 12. Since coils 18 and 56 need only be brought into close proximity to induce signals therebetween, both coils 18 and 56 can be encapsulated to protect them from the elements. This is a distinct improvement on prior art systems which required physical contact elements which often corrode when exposed to the elements.

A detector 60 is connected to the coil 56 for sensing actuation of valve 12. The output of the charging circuit 34 is connected, via the circuit loop 62, to the supervisory circuit loop 16 and acts to feedback the pulsed output of the charging circuit 34 through the loop 62 to the supervisory circuit loop 16 when the charging circuit 34 is actuated. The detector 60 is operable to detect the pulsed output of the charging circuit 34 in the coil 18 in the supervisory circuit loop 16 when the coil 56 is located in close proximity to the coil 18. The coil 18 is operable to induce the pulsed output of the charging circuit into the coil 56. This feedback signal induced in coil 56 is sensed by the detector 60. The signal generator 54 generates a strong AC signal which, if left on continuously, would mask the pulsed feedback signal from the charging circuit 34. However the signal generator 54 generates periodic bursts of AC carrier. Accordingly, the operation of the signal generator 54 and detector 60 are synchronized such that when the signal generator 54 is on, the detector 60 is off, and when generator 54 is off, detector 60 is on. This allows detector 60 to sense the feedback signal from the charging circuit 34 without having the feedback signal masked by the AC carrier generated by the signal generator 54. The detector 60 preferably includes an audio output circuit 64 which is operable to establish an audio output when the detector 60 senses actuation of the charging circuit 34 via the feedback loop 62 and coils 18 and 56. As will be explained more fully below, the charging circuit 34 takes a predetermined period of time to charge capacitor 32. As the charging circuit 34 charges capacitor 32 to a sufficient potential to energize valve 12, a signal will be directed to the detector 60 and an audio output will be established by the audio output circuit 64 while capacitor 32 charges.

A valve sensor 70 is provided responsive to the mechanical movement of the valve 12. When the valve sensor 70 senses actuation of valve 12, the sensor deactivates the charging circuit 34 thereby removing the feedback signal from the loop 62 which is established upon energization of the charging circuit 34. Removal of the feedback signal on loop 62 causes the audio output from the audio output 64 of the detector 60 to cease. Thus, the presence of an audio output at the audio output circuit 64 indicates that the charging circuit 34 is energizing capacitor 32 to effect closing of the valve 12 and the subsequent absence of an audio output at the audio output circuit 64 indicates that the valve 12 has been actuated as sensed by the valve sensor 70. Thus, a positive feedback signal is provided at the detector 60 to enable the user of the system to positively know that the valve 12 has been actuated.

In the preferred embodiment the signal generator 54, detector 60, audio output 64 and coil 56 are packaged together and form a portable, hand-held activator 55. This allows a user of the system to carry a portable unit 55 which is operable to actuate a plurality of individual valves and feedback a signal to the user indicating that the valve has been actuated. Thus, a single signal generator 54 and detector 60 can be utilized with a plurality of systems for actuating a plurality of valves.

Figure 3:
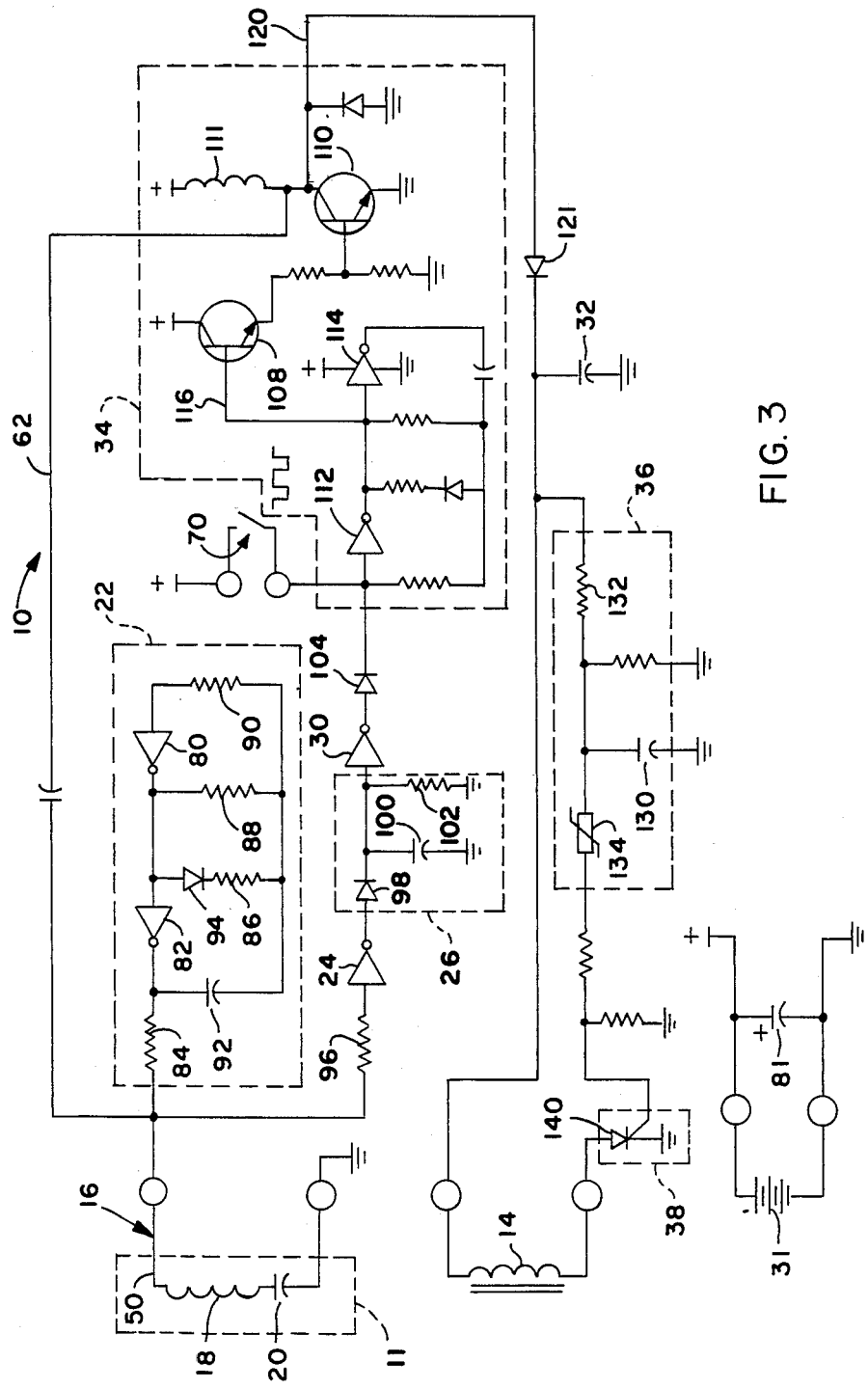
FIG. 3 is a schematic diagram of the system for actuating an electrical valve from a remote location.

The system 10 for actuating the valve 12 is illustrated in more detail in FIG. 3. A power supply in the form of a lithium battery 31 provides a long battery life. A capacitor 81 is connected across battery 31 to bypass the output of the power supply.

The lithium battery energizes the clock circuit 22 or oscillator which includes a pair of inverters 80 and 82, resistors 84, 86, 88 and 90, capacitor 92, and diode 94. The clock 22 operates in a well-known manner to establish an oscillating signal at the output thereof which is directed to the supervisory circuit loop 16. The output of the clock 22 is also connected via a resistor 96 to the input of inverter 24. The inverter 24 operates in a well-known manner to invert the input signal applied thereto and directs its output to the peak detector 26. When there is no signal induced in coil 18 indicative of a desire to close valve 12, and there is no tampering with the supervisory circuit loop 16, the capacitor 20 filters the output of the clock 22 so that the inverter 24 has a high output, as is illustrated in FIG. 4a.

The peak detector 26 includes a diode 98, a capacitor 100 and a resistor 102 which cooperate in a well-known manner to establish an input to inverter 30 which is indicative of the peak output of inverter 24. When an AC waveform from the signal generator 54 is induced in the supervisory circuit loop 16, the input to peak dectector 26 will be periodic burst of squarewaves as is illustrated in FIG. 4n and the output of the peak detector, as is illustrated in FIG. 4o, will be go high. As is illustrated in FIG. 4o, the capacitor 100 is periodically charged by the AC waveform at the output of inverter 24. The voltage appearing across capacitor 100 is directed to the input of inverter 30.

The output of inverter 30 is directed to the input of a diode 104. The charging circuit 34 includes a high voltage fly-back oscillator including driver transistor 108 and switching transistor 110. The charging circuit further includes a pair of inverters 112 and 114. Diode 104 normally has a high output which renders the output of inverter 112 normally low. Inverter 112 cooperates with inverter 114 to form an oscillator circuit having an output connected to a base input 116 of the driver transistor 108. When the input to inverter 112 is high, the oscillator comprised of inverters 112 and 114 will be disabled. When the input to inverter 112 is low the oscillator will be enabled and an oscillating input will be directed to the base 116 of transistor 108. The oscillating input on the base of transistor 108 causes the base of transistor 110 to turn on and off thereby turning transistor 110 on and off to establish a plurality of high voltage pulses on line 120 which are generated by inductor 111 when transistor 110 turns off. The switching on and off of transistor 110 also establishes pulses on feedback loop 62 which is connected to supervisory circuit loop 16. Thus, when the charging circuit 34 is energized, a plurality of high voltage pulses will be established on line 120 to effect charging of the capacitor 32 via diode 121. In addition, a plurality of pulses will be established in the supervisory circuit loop 16. The pulses established in the supervisory circuit loop 16 can be induced in the coil 56 and be detected by the detector 60 to establish an audio output indicating that the capacitor 32 is being charged and that the valve 12 is about to close.

A capacitor 130 is connected via resistor 132 to capacitor 32 and is operable to charge to a voltage level which is proportional to the charge on capacitor 32. The capacitor 130 is connected to the diac 134 which forms a voltage sensitive trigger to close and connect capacitor 130 to the gate of an SCR 140 when the capacitor 32 is charged to a potential sufficient to effect actuation of valve 12. The SCR 140 is connected in series with the coil 14 of the electrical valve 12 and forms the switching means 38 to connect capacitor 32 to coil 14. When the SCR 140 is fired, the energy stored in capacitor 32 energizes coil 14 to actuate valve 12.

Actuation of valve 12 activates the valve sensor 70 which comprises a stem switch 70. When the valve 12 has been closed, stem switch 70 is closed, thereby applying a high to the input of inverter 112 in charging circuit 34. When a high is applied to the input of inverter 112, the oscillator comprising inverters 112 and 114 is disabled. Thus, closing of stem switch 70 disables the oscillator circuit comprised of inverters 112 and 114. Thus, transistor 1OB turns off which turns off transistor 110. When transistor 110 is turned off, there are no pulses on line 120 and there are no feedback pulses on line 62. The stem switch 70 minimizes battery drain by disabling the charging circuit 34 when the valve 12 is closed. The absence of feedback pulses on line 62 is sensed by the detector circuit 60 and the audio output from the audio output circuit 64 ceases. Thus, the presence and subsequent absence of an audio output indicate to the user of the portable activator 55 that the capacitor 32 has been charged and that the valve 12 has subsequently closed, thereby actuating the stem switch 70.

Charging circuit 34 charges capacitor 32 only when it is desired to close valve 12. When capacitor 32 is charged it is only charged to a potential sufficient to energize the valve 12 and then further charging is stopped. This minimizes current drain from the battery 31 and enables the battery 31 to have a long life. The use of a large storage capacitor 32 and the high voltage charging circuit 34 allows the valve 12 to be actuated with the use of a small, low energy battery. In addition, the operation of the charging circuit 34 is additionally used to feedback a signal on line 62 indicative of the fact that the valve is about to close and has actually closed. In addition, the powering of the supervisory circuit loop 16 via the clock 22 and battery 31 enables the supervisory circuit loop 16 to effect actuation of the valve 12 if the supervisory circuit loop 16 is broken or shorted.

Capacitor 32 is charged by the periodic high voltage pulses from the charging circuit 34. It requires a time period to charge capacitor 32 which may be on the order of several seconds. This inherent time delay required to charge capacitor 32 prevents spurious electrical interference from inadvertently effecting charging of capacitor 32 to the predetermined potential necessary to close valve 12.

From the foregoing, it should be apparent that a new and improved system for actuating an electrical valve 12 from a remote location has been provided. The system includes a battery 31, energy storage means 32 for storing a sufficient amount of energy to actuate the valve 12, a charging circuit 34 connected to the battery 31, and to the energy storage means 32 for charging the energy storage means 32 to a sufficient potential to actuate the valve 12. A detector means in the form of a peak detector 26 is providing for sensing a signal indicative of a desire to actuate the valve 12 and for actuating the charging circuit 34 to effect charging of the energy storage means 32 in response to the signal being sensed by the detector means 26. A switch means 38 in the form of SCR 140 is provided for connecting the energy storage means 32 to the coil 14 on the valve 12 to actuate the valve 12 when the energy storage means 32 has been charged to a sufficient potential. The system further includes valve sensing means in the form of stem switch 70 connected to the valve 12 to sense actuation thereof, and a signal generator 54 for generating the signal indicative of a desire to actuate the valve 12. The charging circuit 34 is a frequency generator and establishes a unique signal on line 62 to the supervisory circuit loop 16 which indicates that the valve 12 is about to actuate and the valve sensing means 70 when sensing actuation of the valve 12 deactivates the charging circuit 34 to remove the unique signal from the supervisory circuit loop 16. A detector means 60 is provided to sense the presence or absence of the unique signal at the coil 18 which is a signal sensing means for detecting actuation of the valve 12. The supervisory circuit loop 16 is adapted to have a signal indicative of a desire to close the valve induced in the signal sensing means 18 to thereby actuate the charging circuit 34 to charge the energy storage means 32 to a sufficient potential to actuate the valve 12. In addition, the supervisory circuit loop 16, when broken or when shorted, is operable to actuate the charging circuit 34 to charge the energy storage means 32 to a sufficient potential to actuate the valve.

What is claimed is:

1. A system for actuating an electrical valve from a remote location comprising a battery, energy storage means for storing a sufficient amount of energy to actuate the valve, a charging circuit connected to said battery and to said energy storage means for charging said energy storage means to a sufficient potential to actuate the valve, detector means for sensing a signal indicative of a desire to actuate the valve and actuating said charging circuit to effect charging of said energy storage means in response to said signal being sensed by said detector means and switch means for connecting said energy storage means to the valve to actuate the valve when said energy storage means is charged to a potential sufficient to actuate the valve, said charging circuit including a high voltage oscillator and said energy storage means comprising a capacitor, said high voltage oscillator being operative to charge said capacitor to said predetermined potential in response to said signal being sensed by said detector means, and wherein said detector means includes a peak detector connected to said high voltage oscillator for actuating said high voltage oscillator in response to sensing said signal indicative of a desire to actuate the valve.

2. A system for actuating an electrical valve from a remote location as defined in claim 1 further including a signal generator for establishing said signal indicative of a desire to actuate the valve.

3. A system for actuating an electrical valve from a remote location as defined in claim 2 wherein said signal generator establishes periodic bursts of an AC current to said peak detector for enabling said peak detector to actuate said high voltage oscillator.

4. A system for actuating an electrical valve from a remote location comprising a battery, energy storage means for storing a sufficient amount of energy to actuate the valve, a charging circuit connected to said battery and to said energy storage means for charging said energy storage means to a sufficient potential to actuate the valve, detector means for sensing a signal indicative of a desire to actuate the valve and actuating said charging circuit to effect charging of said energy storage means in response to said signal being sensed by said detector means, switch means for connecting said energy storage means to the valve to actuate the valve when said energy storage means is charged to a potential sufficient to actuate the valve, a supervisory circuit loop connected to said detector means, a supervisory signal generator, said supervisory circuit loop connected to the output of said supervisory signal generator and to said detector means, a capacitor connected in said supervisory circuit loop as the supervisory element and a signal sensing means connected to said supervisory loop for sensing said signal indicative of a desire to actuate the valve.

5. A system for actuating an electrical valve from a remote location as defined in claim 4 further including a signal generator for establishing said signal indicative of a desire to close the valve.

6. A system for actuating an electrical valve from a remote location as defined in claim 5 wherein said signal generator establishes an AC waveform indicative of a desire to actuate the valve which is directed to said signal sensing means to direct such AC waveform through said said supervisory circuit loop to said detector means.

7. A system for actuating an electrical valve from a remote location as defined in claim 5 wherein said signal sensing means comprises a first coil and further including a second coil connected to said signal generator, said signal generator establishing said signal indicative of a desire to close the valve in said second coil, and said second coil being operable to induce said signal indicative of a desire to close the valve in said first coil when said second coil is disposed in close proximity to but spaced apart from said first coil.

8. A system for actuating an electrical valve from a remote location as defined in claim 4 wherein said supervisory circuit loop when shorted establishes a signal in said supervisory circuit loop to said detector means which effects actuation of the valve.

9. A system for actuating an electrical valve from a remote location as defined in claim 4 wherein said supervisory circuit loop when broken establishes a signal in said supervisory circuit loop to said detector means which effects actuation of the valve.

10. A system for actuating an electrical valve from a remote location as defined in claim 9 wherein said supervisory circuit loop when shorted establishes a signal in said supervisory circuit loop to said detector means which effects actuation of the valve.

11. A system for actuating an electrical valve from a remote location as defined in claim 4 further including a feedback circuit connected to the valve for providing an indication in said supervisory circuit loop that the valve has been actuated.

12. A system for actuating an electrical valve from a remote location as defined in claim 11 wherein said feedback circuit directs a unique signal generated by said charging circuit to said supervisory circuit loop when said charging circuit effects charging of said energy storage means.

13. A system for actuating an electrical valve from a remote location as defined in claim 12 wherein said feedback circuit further includes valve sensor means connected to the valve for sensing actuation thereof.

14. A system for actuating an electrical valve from a remote location as defined in claim 13 wherein said valve sensor means is operable to deactivate said charging circuit and remove said unique signal established by said charging circuit from said supervisory circuit loop upon actuation of the valve.

15. A system for actuating an electrical valve from a remote location as defined in claim 14 further including second detector means for detecting the presence and absence of said unique signal in said supervisory circuit loop.

16. A system for actuating an electrical valve from a remote location as defined in claim 15 further including a signal generator for establishing said signal indicative of a desire to close the valve and wherein said second detector means and said signal generator are packaged together and are portable.

17. A system for actuating an electrical valve from a remote location comprising switch means for actuating the valve, valve sensing means connected to the valve to sense actuation thereof, signal sensing means for sensing a signal indicative of a desire to actuate the valve, a signal generator for generating said signal indicative of a desire to actuate the valve, circuit means responsive to said signal sensing means sensing said signal for establishing a unique signal at said signal sensing means which indicates that the valve is about to actuate, said valve sensing means when sensing activation of the valve deactuating said circuit means to remove said unique signal at said signal sensing means and detector means responsive to the presence or absence of said unique signal at said signal sensing means for detecting actuation of the valve.

18. A system for actuating an electrical valve from a remote location as defined in claim 17 wherein said signal sensing means includes a coil and said signal generator is operable to induce in said coil said signal indicative of a desire to actuate the valve without contacting said coil.

19. A system for actuating an electrical valve from a remote location as defined in claim 18 wherein said signal generator is operable to induce an AC wavefore in said coil.

20. A system for actuating an electrical valve from a remote location as defined in claim 17 wherein said circuit means is a frequency generator which is operable to establish said unique signal at said signal sensing means to indicate that the valve is about to actuate.

21. A system for actuating an electrical valve from a remote location as defined in claim 20 wherein said frequency generator comprises a high voltage oscillator.

22. A system for actuating an electrical valve from a remote location as defined in claim 20 wherein said detector means is responsive to said unique signal established by said frequency generator, said detector means sensing the presence of said unique signal established by said frequency generator to indicate that the valve is about to actuate and the subsequent absence of said unique signal to indicate that the valve has been actuated.

23. A system for actuating an electrical valve from a remote location as defined in claim 22 wherein said detector means is operable to establish a unique audio tone in response to the presence to said unique signal.

24. A system for actuating an electrical valve from a remote location as defined in claim 23 wherein said signal generator and said detector means are packaged together and are portable.

25. A system for actuating, an electrical valve from a remote location as defined in claim 17 further including a supervisory circuit loop, said signal sensing means being located in said supervisory circuit loop, said signal generator being operable to induce in said signal sensing means and said supervisory circuit loop said signal indicative of a desire to actuate the valve, said circuit means being operable to establish said unique signal in said supervisory loop and direct said unique signal to said signal sensing means and wherein said detector means is operable to detect the presence or absence of said unique signal in said supervisory loop at said signal sensing means.

26. A system for actuating an electrical valve from a remote location comprising a battery, energy storage means for storing a sufficient amount of energy to actuate the valve, a charging circuit connected to said battery and said energy storage means for charging said energy storage means to a sufficient potential to actuate the valve, a supervisory circuit loop energized by said battery, and a capacitor disposed in said supervisory circuit loop as the supervisory element thereof, said supervisory circuit loop adapted to receive a signal indicative of a desire to close the valve to actuate said charging circuit to charge said energy storage means to a sufficient potential to actuate the valve, said supervisory circuit loop when broken actuating said charging circuit to charge said energy storage means to a sufficient potential to actuate the valve, and said supervisory circuit loop when shorted actuating said charging circuit to charge said energy storage means to a sufficient potential to actuate the valve.

27. A system for actuating an electrical valve from a remote location as defined in claim 26 further including signal sensing means located in said supervisory circuit loop for sensing said signal indicative of a desire to close the valve and actuating said charging circuit in response thereto.

28. A system for actuating an electrical valve from a remote location as defined in claim 27 wherein said signal sensing means includes a coil in series with said capacitor in said supervisory circuit loop.

29. A system for actuating an electrical valve from a remote location as defined in claim 26 further including a signal generator for establishing said signal indicative of a desire to close the valve.

30. A system for actuating an electrical valve from a remote location as defined in claim 27 further including a signal generator for establishing said signal indicative of a desire to close the valve and wherein said signal sensing means includes a coil in series with said capacitor and said signal generator is operable to induce an AC wavefore to said coil which is indicative of a desire to close the valve.

31. A system for actuating an electrical valve from a remote location as defined in claim 27 further including detector means connected to said supervisory circuit loop for actuating said charging circuit to charge said energy storage means upon receipt of said signal indicative of a desire to close the valve from said signal generator or if said supervisory circuit loop is shorted or opened.

32. A system for actuating an electrical valve from a remote location as defined in claim 31 wherein said charging circuit includes a high voltage oscillator and said energy storage means comprises a second capacitor, said high voltage oscillator being operative to charge said second capacitor to said predetermined potential in response to said signal being sensed by said detector means.

33. A system for actuating an electrical valve from a remote location as defined in claim 26 further including a feedback circuit connected to said valve for providing an indication in said supervisory circuit loop that the valve has been actuated.

34. A system for actuating an electrical valve from a remote location as defined in claim 33 wherein said feedback circuit directs a modulated signal generated by said charging circuit to said supervisory circuit loop when said charging circuit effects charging of said energy storage means.

35. A system for actuating an electrical valve from a remote location as defined in claim 34 wherein said feedback circuit further includes valve sensor means connected to the valve for sensing actuation thereof.

36. A system for actuating an electrical valve from a remote location as defined in claim 35 wherein said valve sensor means is operable to deactuate said charging circuit and remove said unique signal established by said charging circuit from said supervisory circuit loop.

37. A system for actuating an electrical valve from a remote location as defined in claim 36 further including second detector means for detecting the presence and absence of said unique signal on said supervisory circuit loop.

38. A system for actuating an electrical valve from a remote location comprising a battery, energy storage means for storing a sufficient amount of energy to actuate the valve, a charging circuit connected to said battery and to said energy storage means for charging said energy storage means to a sufficient potential to actuate the valve, detector means for sensing a signal indicative of a desire to actuate the valve and actuating said charging circuit to effect charging of said energy storage means in response to said signal being sensed by said detector means, switch means for connecting said energy storage means to the valve to actuate the valve when said energy storage means is charged to a potential sufficient to actuate the valve, and second sensing means connected to said energy storage means for actuating said switch means when said energy storage means is charged to a predetermined potential, said energy storage means comprising a capacitor, said switch means for connecting said capacitor to the valve comprising a SCR and said second sensing means comprises a diac operatively connected to said capacitor and said SCR, said diac firing said SCR when said capacitor is charged to a predetermined potential to connect said capacitor to the valve.

* * * * *